March 11, 1930.  A. G. BAUMBACH  1,749,869
FISHING TOOL
Filed Oct. 29, 1928
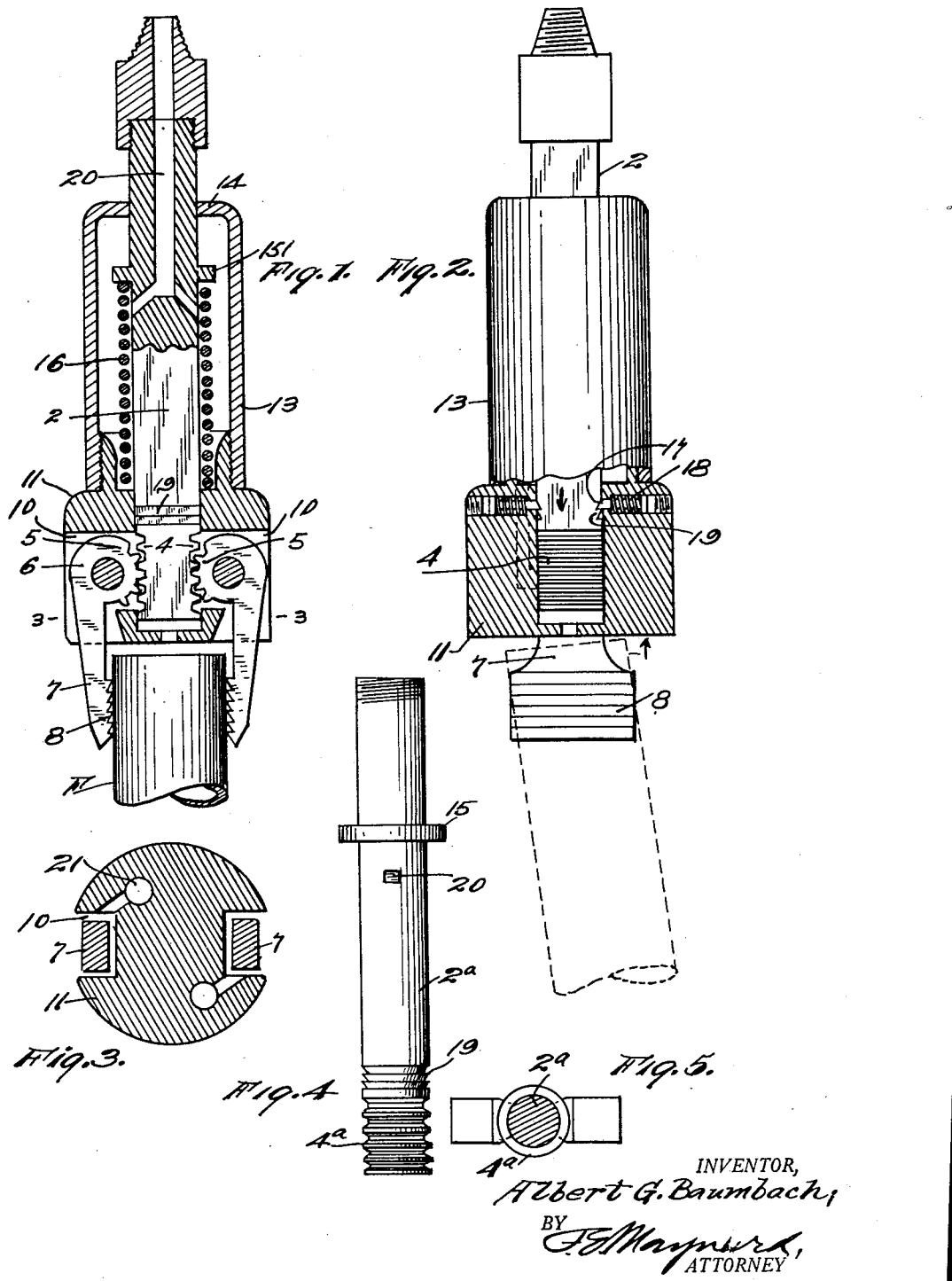
INVENTOR,
Albert G. Baumbach,
BY
ATTORNEY Patented Mar. 11, 1930

1,749,869

UNITED STATES PATENT OFFICE

ALBERT G. BAUMBACH, OF ANAHEIM, CALIFORNIA

FISHING TOOL

Application filed October 29, 1928. Serial No. 315,710.

This invention relates to equipment known in the deep well drilling art as "fishing tools."

An important object of the invention is to provide a tool of this class which is of utmost simplicity, and few and substantial parts.

A further object is to provide a tool which is self-tripping when encountering the object being fished for. A further object is to provide a tool which may be sent down with its gripping means in either open or closed position and which is so constructed that the pulling effort is translated into gripping pressure on the object fished and wherein the gripping pressure is directly proportional to the weight of the fish.

A further purpose is to provide a tool which may be utilized with or without a rotary action of its elevator string.

Other objects, advantages and features of construction and combination will be made manifest in the ensuing description of the herewith illustrative apparatus; it being understood that modifications, variations and adaptations may be resorted to within the spirit, scope and principle of the invention as it is more directly claimed hereinafter.

Figure 1 is an axial section of the tool grasping a fished object.

Figure 2 is a sectional elevation showing locking means.

Figure 3 is cross-section on line 3—3, Fig. 1.

Figure 4 is a side view of a modified form of tool stem.

Figure 5 is a cross-section of the modified stem.

The tool includes a stem 2 which in Fig. 1 is of square cross-section and in Fig. 4 is of circular-section as is desired when the stem is to be rotated for unscrewing or screwing up threaded sections on occasions. The lower ends of the stem 2 has, on opposite faces, racks of teeth 4 and the stem 2ª has its rack teeth 4ª cut entirely around its body.

The rack teeth of the stem are in constant mesh with gear segments 5 provided on hub portions 6 of downwardly extending arms 7 whose inner or opposed faces are provided with efficient gripping teeth 8 so that the members 7 constitute gripping jaws which are designed to be moved toward each other to grapple an interposed object or fished body F.

The jaws 7 have pivots 9 by which the jaws are pivotally mounted in sidepockets 10 provided in a housing or box 11. This box slidably receives the stem 2 and is provided with an attached jacket 13 in which the upper end of the stem is guided and supported in a bearing flange 14. The stem is provided with a collar 15 of such diameter as to encounter the flange 14 in case the stem teeth 4 should separate from the teeth 5 of the jaws 7.

Means is provided having the normal function of pressing the box 11 downward along the stem 2 with a resultant closing action on the jaws 7.

This means includes a stout spring 16 surrounding the stem 2 and bearing against the collar 15 and against the top of the box 11. The effect of this is to move the jaw ends inward. In the event that the tool encounters the fished for body its resistance against the jaws as the stem 2 is lowered by its elevator (not shown) causes the box 11 to stand still while the stem may move further down and since it is in mesh with the gears 5 the stem forces the jaws 7 open. When the jaws clear the top of the obstacle they will then snap down around the top of the obstacle and move inward under action of the spring 16. When the operative handling the elevator is satisfied that the fish is caught the tool is pulled upward with the result that the jaws are forced inward tight on the fish and continued upward movement of the tool clinches the jaws on the fish and it is pulled up with and by the tool.

In some cases the jaws may be sent down while locked in an open position in which they are retained by a set of bolts 17 mounted in the box and normally pressed outward by springs 18. The inner ends of the bolts 17 are adapted to frictionally bind against shoulders 19 provided on the stem 2 in such position as to lock the box 10 to the stem 2 while the jaws 7 are expanded; the shoulders 19 serving to prevent the spring 16 from pushing the box 11 downward with closing action on the jaws 7 until the bolts 17 shall be cleared from the shoulders 19. Releasing action of the bolts will occur when the bottom of the box 11 encounters the top of the fish F, Fig. 2, whose reaction will stop the box 11 as the stem 2 moves down and this will relieve the bolts 17 from contact with the shoulders 19 so that the springs 18 will pull the bolts clear of the stem.

Then the spring 16 can close the jaws 7 by pressing the box down along the stem 2.

It is desirable to provide for the effective supply of water close to the bottom of the fishing tool so as to wash away loose formation which may be found at the head of the fished for obstacle. To that end the stem 2 has a water duct 20 receiving water from the superstructure of the stem string and discharging it into the chamber in the jacket 13 from which it flows through passages 21 to the pockets 10 in which the jaws 7 work.

While the stem 2 of Fig. 1 is of non-circular cross-section and cannot rotate in the box 11 such rotation is provided for by the stem $2^a$ Fig. 4 which has its teeth $4^a$ cut all around so that it can be rotated while in mesh with the gears 5 of the jaws. In such stem $2^a$ the lock teeth or shoulders 19 are formed entirely around the stem.

It will be seen that during operation of pulling the grappled fish the upward pull of the rack teeth 4 tends to rotate the gears 5 on their axes 9 and force the jaws in onto the fish F. The heavier this is the greater will be the translated pulling force into gripping pressure on the fish.

What is claimed is:

1. A fishing tool including a stem having a rack portion, opposed gripping jaws meshing with the rack portion, and a mount in which the jaws are pivoted spring acting on the mount to close the jaws, and bolts in the mount to engage the stem.

2. A fishing tool including a stem having a rack portion, opposed gripping jaws meshing with the rack portion, and a mount in which the jaws are pivoted, and means acting on the mount with a tendency to close the jaws.

3. A fishing tool including a stem having a rack portion, opposed gripping jaws meshing with the rack portion, a mount in which the jaws are pivoted, and means acting on the mount with a tendency to close the jaws, said stem acting to close the jaws on an interposed fish to grapple it.

ALBERT G. BAUMBACH.